United States Patent
Bidner et al.

(10) Patent No.: US 11,092,063 B1
(45) Date of Patent: Aug. 17, 2021

(54) SYSTEMS AND METHODS FOR ENGINE PRE-CHAMBER COOLANT FLOW

(71) Applicant: Ford Global Technologies, LLC, Dearborn, MI (US)

(72) Inventors: David Karl Bidner, Livonia, MI (US); Ronald Richard Semel, West Bloomfield, MI (US); Waqas Ahmed Manzoor, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/816,931

(22) Filed: Mar. 12, 2020

(51) Int. Cl.
| | | |
|---|---|---|
| F01P 3/12 | (2006.01) | |
| F01P 5/10 | (2006.01) | |
| F01P 7/14 | (2006.01) | |
| F02B 19/12 | (2006.01) | |
| F01P 3/18 | (2006.01) | |
| F02M 61/14 | (2006.01) | |
| F02F 1/16 | (2006.01) | |

(52) U.S. Cl.
CPC .......... *F01P 3/12* (2013.01); *F01P 3/18* (2013.01); *F01P 5/10* (2013.01); *F01P 7/14* (2013.01); *F02B 19/12* (2013.01); *F02F 1/16* (2013.01); *F02M 61/14* (2013.01); *F01P 2003/182* (2013.01); *F01P 2007/146* (2013.01); *F01P 2025/08* (2013.01)

(58) Field of Classification Search
CPC ........ F01P 3/12; F01P 3/18; F01P 5/10; F01P 7/14; F01P 2003/182; F01P 2007/146; F01P 2025/08; F02B 19/12; F02B 19/1023; F02F 1/16; F02F 3/26; F02F 1/40; F02F 1/26; F02M 61/14

USPC .......................................................... 123/254
See application file for complete search history.

(56) References Cited

U.S. PATENT DOCUMENTS

| | | | |
|---|---|---|---|
| 4,364,339 A | 12/1982 | Fricker et al. | |
| 5,701,851 A * | 12/1997 | Nakano .................. | F01P 7/165 123/41.1 |
| 5,778,849 A | 7/1998 | Regueiro | |
| 8,365,689 B2 * | 2/2013 | Gruber ...................... | F01P 3/16 123/41.55 |
| 8,813,716 B2 * | 8/2014 | Herold ................ | F02B 19/1009 123/254 |
| 9,617,908 B2 | 4/2017 | Willi | |
| 2012/0103302 A1 | 5/2012 | Attard | |
| 2015/0083058 A1* | 3/2015 | Becker ...................... | F02F 1/40 123/41.29 |
| 2015/0083070 A1* | 3/2015 | Becker ...................... | F02F 1/40 123/254 |
| 2016/0326946 A1 | 11/2016 | Willi | |
| 2016/0333820 A1* | 11/2016 | Kodama .......... | F02M 35/10222 |
| 2016/0348560 A1 | 12/2016 | Willi | |

FOREIGN PATENT DOCUMENTS

| | | | | |
|---|---|---|---|---|
| DE | 3809687 A1 * | 10/1988 | ................ | F01P 3/02 |
| EP | 3051092 A1 * | 8/2016 | ................ | F01P 3/16 |
| WO | 2014191085 A1 | 12/2014 | | |

* cited by examiner

*Primary Examiner* — Mahmoud Gimie
(74) *Attorney, Agent, or Firm* — Geoffrey Brumbaugh; McCoy Russell LLP (57) ABSTRACT

Methods and systems are provided for a pre-chamber. In one example, a system comprises flowing a mixture of coolants to a coolant chamber of the pre-chamber. Additionally or alternatively, only one coolant may be directed to the coolant chamber during some conditions.

19 Claims, 5 Drawing Sheets

SYSTEMS AND METHODS FOR ENGINE PRE-CHAMBER COOLANT FLOW

FIELD

The present description relates generally to a pre-chamber ignition system and method for operation of such a system.

BACKGROUND/SUMMARY

Engines have in the past utilized pre-chamber combustion to increase combustion efficiency and correspondingly reduce emissions. Pre-chamber combustion systems typically include an auxiliary pre-chamber above the main combustion chamber with an ignition device and fuel injector coupled to the auxiliary pre-chamber. In such systems, combustion unfolds in the following sequence; (i) a small amount of fuel is directly injected into the pre-chamber, (ii) spark is provided to the air/fuel mixture in the pre-chamber; and (iii) the hot gas jets into the main combustion chamber to ignite the charge disposed therein. Jetting the ignited gas into the main combustion chamber in this manner enables hot gas jets to penetrate deeper into the main combustion chamber, causing more evenly distributed ignition, when compared to engines that do not employ pre-chamber schemes.

One example approach shown by Attard in U.S. 2012/0103302 includes a system with an ignition assembly with a pre-chamber, a fuel injector, and a spark plug that is mounted in the cylinder head above the main combustion chamber. Attard's pre-chamber ignition system achieves fast burn in fuel-lean conditions. However, the inventors have recognized several potential drawbacks with Attard's system and other pre-chamber assemblies. For instance, residual burned gases may dwell in the pre-chamber, diluting the air/fuel mixture in subsequent combustion cycles. As a result, combustion efficiency is decreased and emissions are associatively increased. Moreover, the supplemental fuel injected into the pre-chamber may not enhance ignitibility or burn rate during stoichiometric conditions. Therefore, Attard's system may only achieve efficiency gains during a limited window of engine operation.

Other issues arise with limited temperature control of the pre-chamber. In previous examples, the pre-chamber may receive coolant from only a single coolant circuit. This may limit cooling and/or heating of the pre-chamber which may result in a myriad of issues including but not limited to a tip erosion temperature limit being reached, a coking temperature limit being reached, an optimal combustion temperature and/or a combustion stability temperature being over or under shot, and pre-chamber knock occurring.

In one example, the issues described above may be addressed by a system comprising a pre-chamber configured to combust fuel and air outside of a primary combustion chamber, wherein the pre-chamber is configured to receive a blended coolant flow comprising coolant from two separate coolant circuits.

As one example, the coolant flow may include a first flow from a first coolant circuit and a second flow from a second coolant circuit. The first coolant circuit may be a primary coolant circuit and the second coolant circuit may be a secondary coolant circuit. Temperatures of the coolant circuits may differ in that the first coolant circuit is a high-temperature coolant circuit and the second coolant circuit is a low temperature coolant circuit. The coolants may be mixed via a coolant blending valve configured to blend a desired amount of each of the coolants to obtain a desired coolant temperature. In this way, the issues described above may be avoided via enhanced control of the pre-chamber temperature via mixing two coolant flows.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
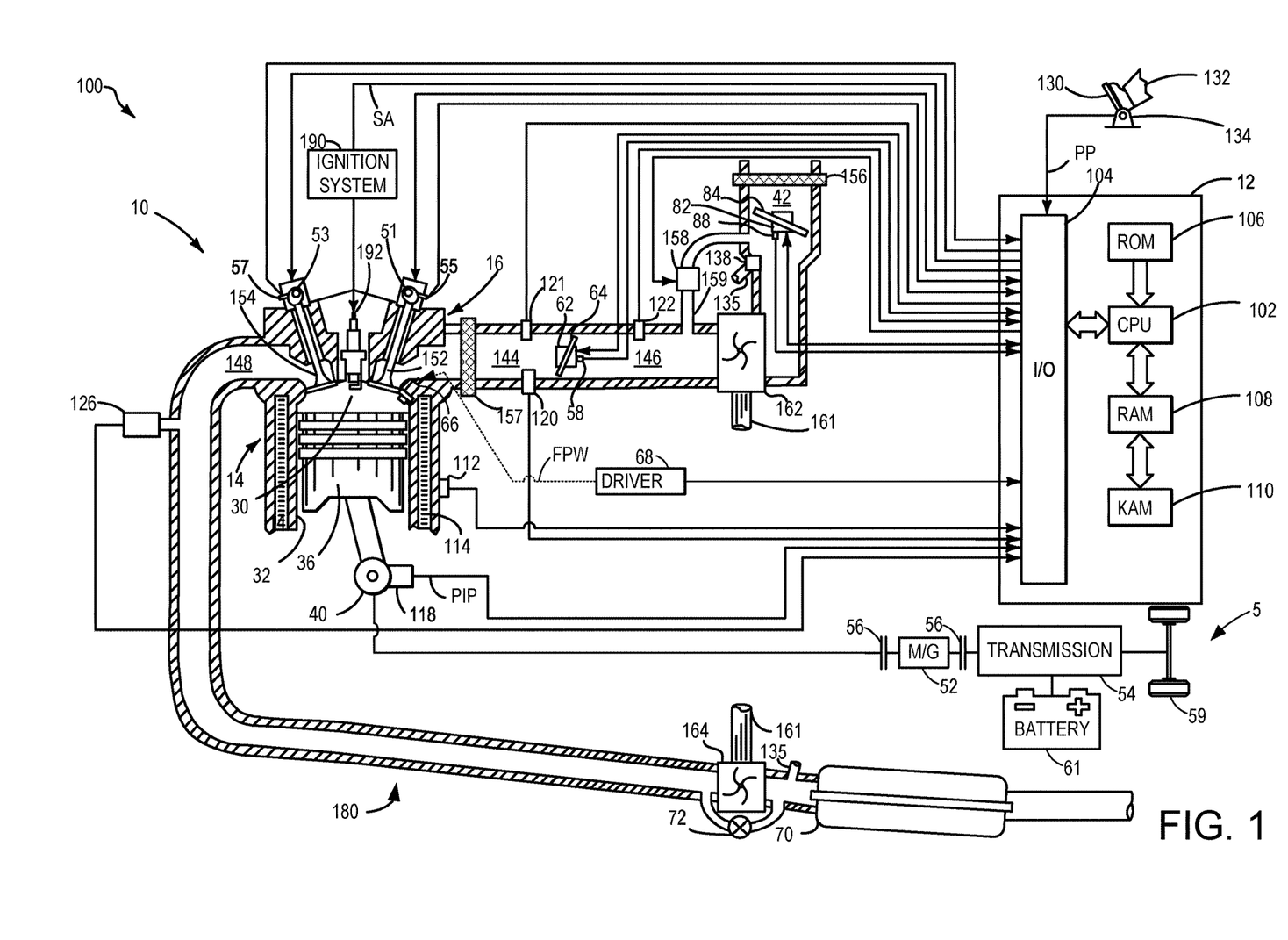
FIG. 1 illustrates an engine of a hybrid vehicle.

The following description relates to systems and methods for flowing coolant to a pre-chamber. The pre-chamber is configured to receive air and fuel separately from a primary combustion chamber. The pre-chamber further comprises an ignition device, such as a spark plug, configured to ignite the air/fuel mixture. The air/fuel mixture may then be injected and/or jetted into the primary combustion chamber, wherein the air/fuel mixture may penetrate the primary combustion chamber and enhance ignition distribution. The primary combustion chamber is illustrated in FIG. 1, which illustrates an engine included in a hybrid vehicle. It will be appreciated that the engine may be included in non-hybrid vehicles (e.g., having only an internal combustion engine) or in other types of hybrid vehicles, such as plug-in hybrid vehicles.

Figure 2:
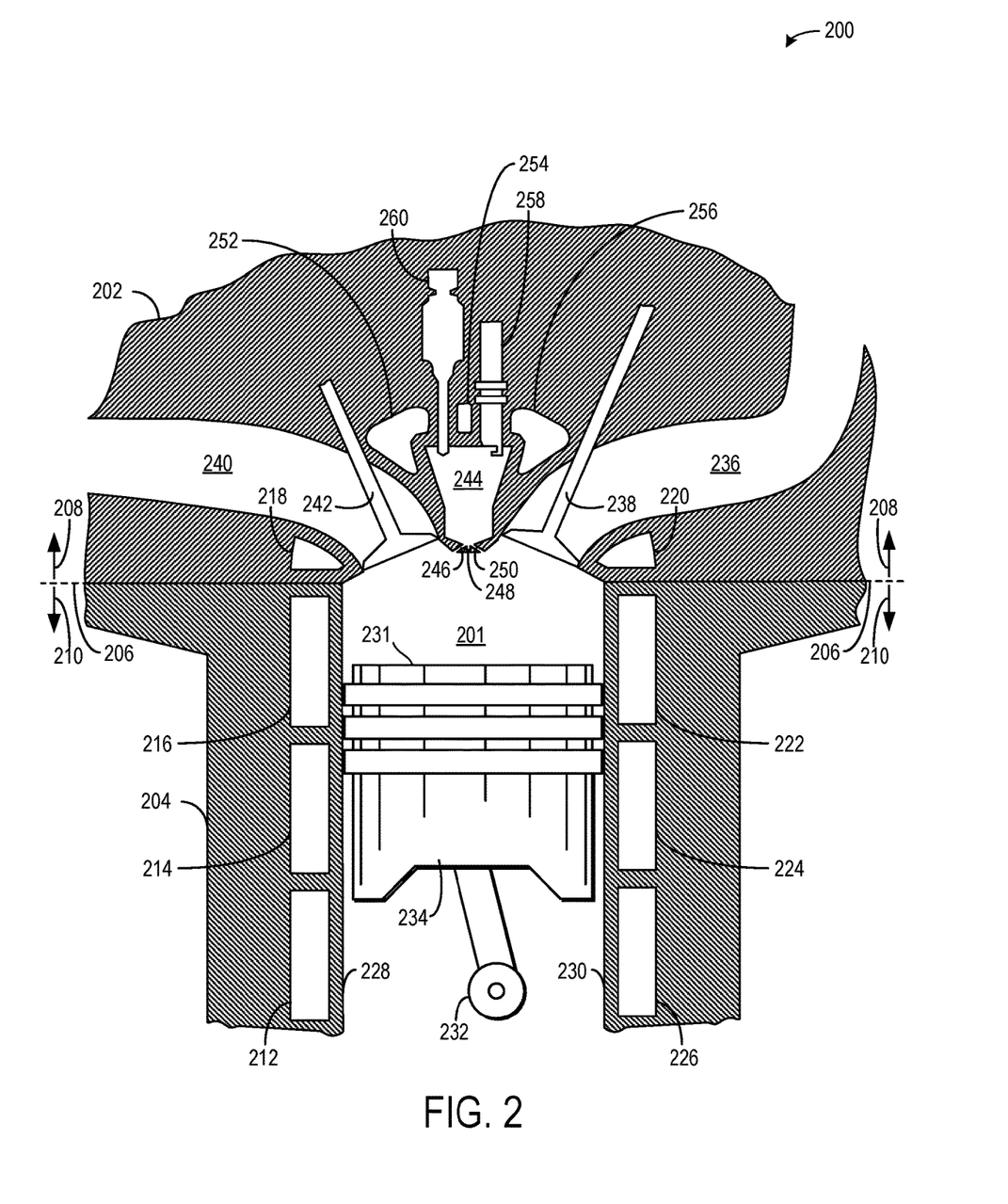
FIG. 2 illustrates a pre-chamber of the engine, the pre-chamber configured to direct a hot air/fuel mixture into a primary combustion chamber.
Figure 3:
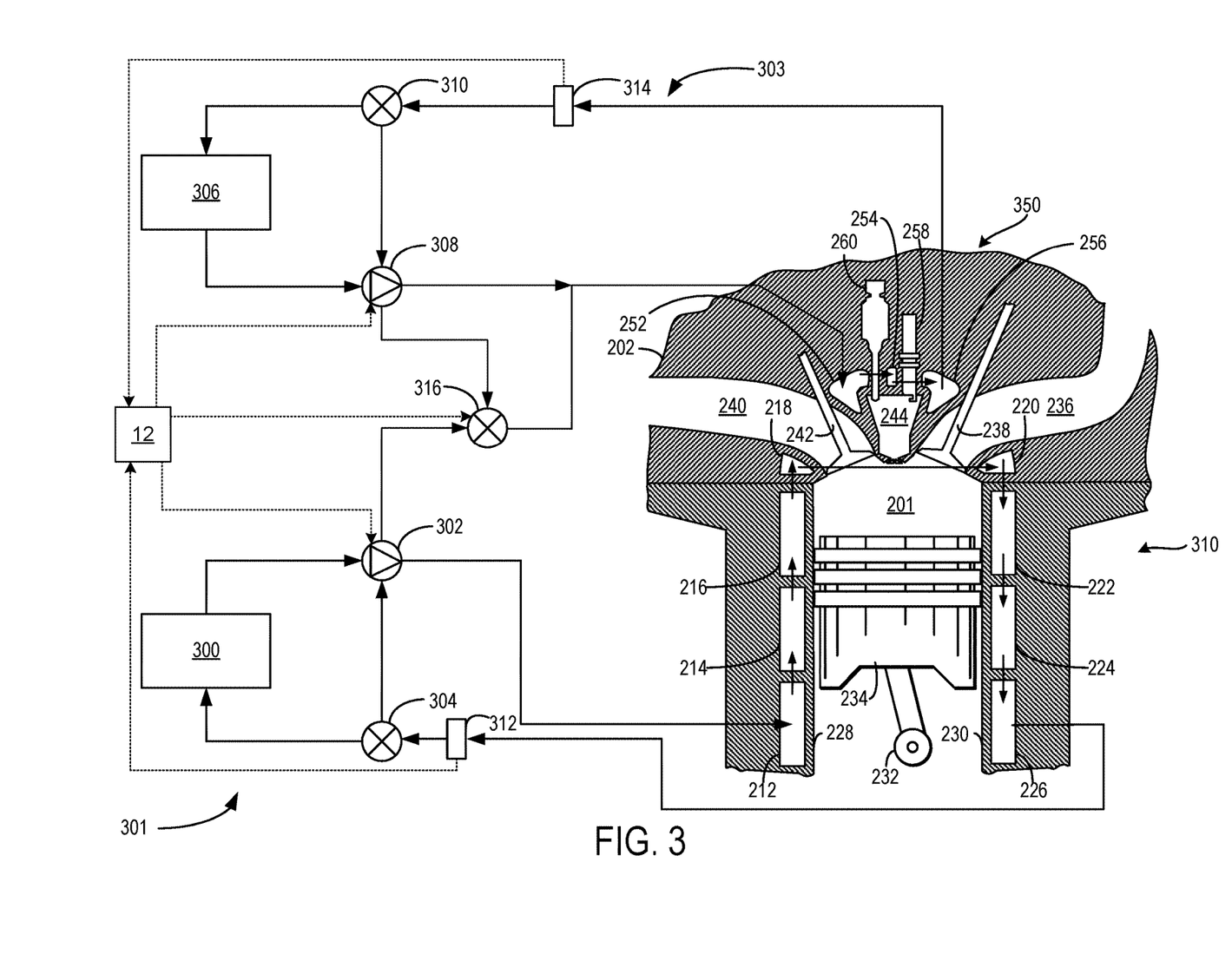
FIG. 3 illustrates a coolant flow diagram of each of the pre-chamber and the primary combustion chamber.

An example of the pre-chamber is illustrated in FIG. 2. The pre-chamber may be situated in a head region of the engine. In one example, the pre-chamber is arranged adjacent to the fire deck of the primary combustion chamber. An example coolant flow to each of the primary combustion chamber and the pre-chamber is illustrated in FIG. 3. Therein, the primary combustion chamber may receive coolant from only a first coolant circuit. A second coolant circuit may be configured to flow coolant to only the pre-chamber. A valve may be configured to adjust a second coolant flow from the second coolant circuit to the pre-chamber. In one example, the valve may be a multi-way valve wherein the valve may be further configured to adjust a first coolant flow from the first coolant circuit to the pre-chamber. As such, during some operating conditions, the first coolant and the second coolant may mix within the pre-chamber to provide enhanced temperature control of the pre-chamber.

Figure 4:
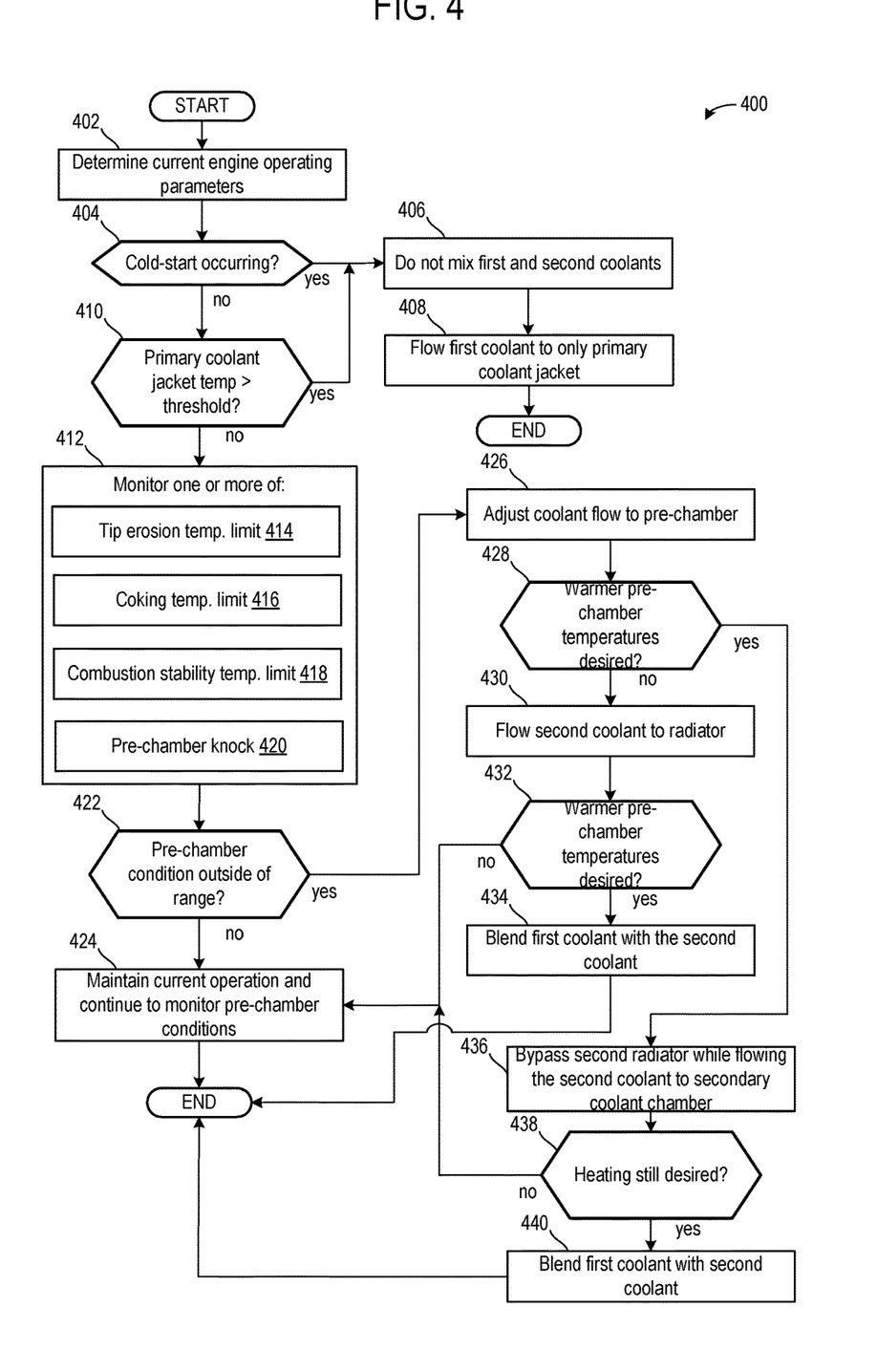
FIG. 4 illustrates a method for flowing coolant to the pre-chamber including flowing only coolant from a first coolant circuit, a second coolant circuit, or mixing coolants from the first and second coolant circuits.

A method for adjusting coolant flow to the pre-chamber via adjustment of a position of the valve is illustrated in FIG.

Figure 5:
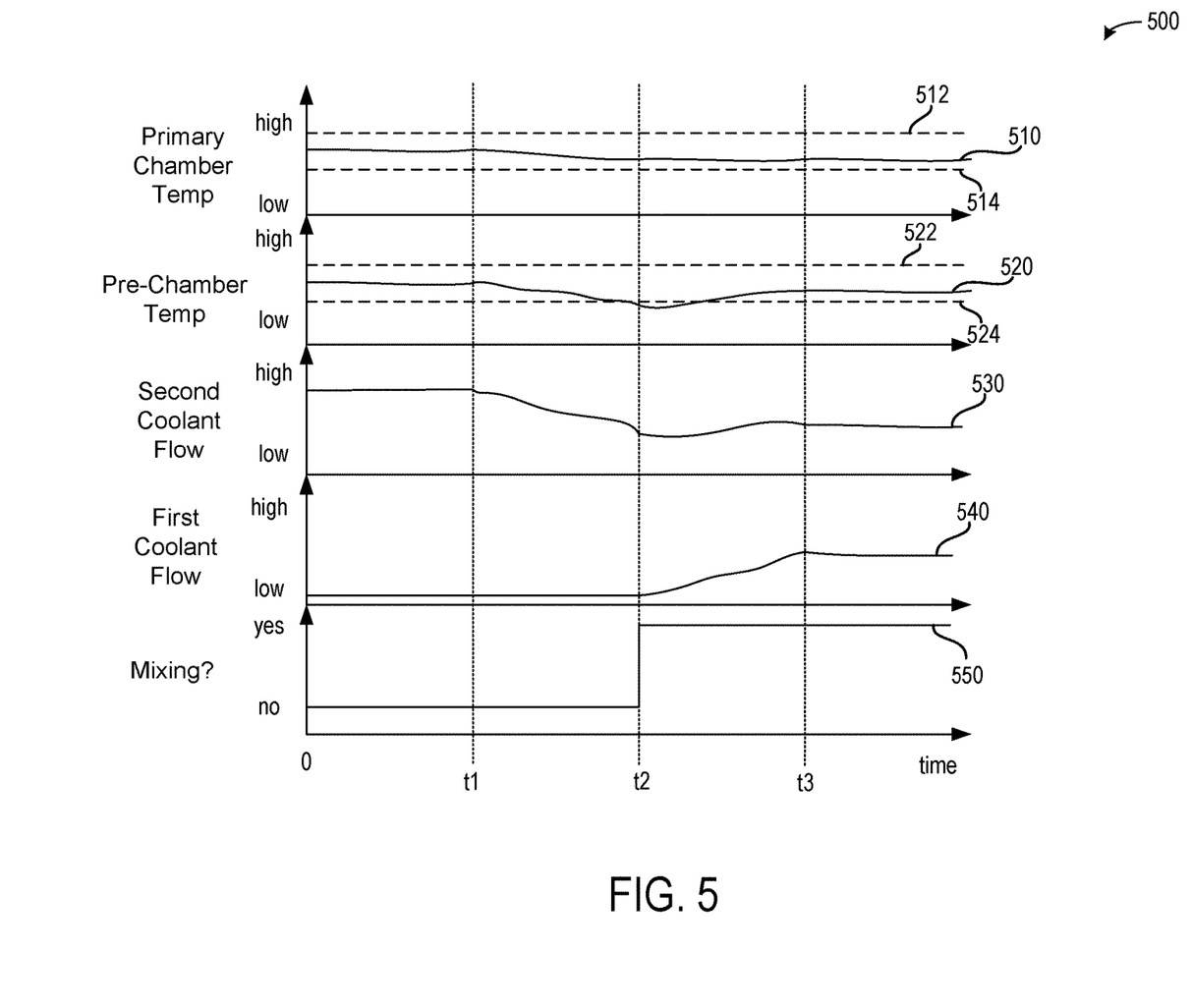
FIG. 5 illustrates a prophetic engine operating sequence plotting changes in coolant flow to the pre-chamber in response to a variety of pre-chamber conditions.

4. A prophetic engine operating sequence for adjusting the coolant flow based on one or more pre-chamber conditions is illustrated in FIG. 5.

FIG. 1 depicts an engine system 100 for a vehicle. The vehicle may be an on-road vehicle having drive wheels which contact a road surface. Engine system 100 includes engine 10 which comprises a plurality of cylinders. FIG. 1 describes one such cylinder or combustion chamber in detail. The various components of engine 10 may be controlled by electronic engine controller 12.

Engine 10 includes a cylinder block 14 including at least one cylinder bore, and a cylinder head 16 including intake valves 152 and exhaust valves 154. In other examples, the cylinder head 16 may include one or more intake ports and/or exhaust ports in examples where the engine 10 is configured as a two-stroke engine. The cylinder block 14 includes cylinder walls 32 with piston 36 positioned therein and connected to crankshaft 40. Thus, when coupled together, the cylinder head 16 and cylinder block 14 may form one or more combustion chambers. As such, the combustion chamber 30 volume is adjusted based on an oscillation of the piston 36. Combustion chamber 30 may also be referred to herein as cylinder 30. The combustion chamber 30 is shown communicating with intake manifold 144 and exhaust manifold 148 via respective intake valves 152 and exhaust valves 154. Each intake and exhaust valve may be operated by an intake cam 51 and an exhaust cam 53. Alternatively, one or more of the intake and exhaust valves may be operated by an electromechanically controlled valve coil and armature assembly. The position of intake cam 51 may be determined by intake cam sensor 55. The position of exhaust cam 53 may be determined by exhaust cam sensor 57. Thus, when the valves 152 and 154 are closed, the combustion chamber 30 and cylinder bore may be fluidly sealed, such that gases may not enter or leave the combustion chamber 30.

Combustion chamber 30 may be formed by the cylinder walls 32 of cylinder block 14, piston 36, and cylinder head 16. Cylinder block 14 may include the cylinder walls 32, piston 36, crankshaft 40, etc. Cylinder head 16 may include one or more fuel injectors such as fuel injector 66, one or more intake valves 152, and one or more exhaust valves such as exhaust valves 154. The cylinder head 16 may be coupled to the cylinder block 14 via fasteners, such as bolts and/or screws. In particular, when coupled, the cylinder block 14 and cylinder head 16 may be in sealing contact with one another via a gasket, and as such the cylinder block 14 and cylinder head 16 may seal the combustion chamber 30, such that gases may only flow into and/or out of the combustion chamber 30 via intake manifold 144 when intake valves 152 are opened, and/or via exhaust manifold 148 when exhaust valves 154 are opened. In some examples, only one intake valve and one exhaust valve may be included for each combustion chamber 30. However, in other examples, more than one intake valve and/or more than one exhaust valve may be included in each combustion chamber 30 of engine 10.

In some examples, each cylinder of engine 10 may include a spark plug 192 for initiating combustion. Ignition system 190 can provide an ignition spark to cylinder 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

Fuel injector 66 may be positioned to inject fuel directly into combustion chamber 30, which is known to those skilled in the art as direct injection. Fuel injector 66 delivers liquid fuel in proportion to the pulse width of signal FPW from controller 12. Fuel is delivered to fuel injector 66 by a fuel system (not shown) including a fuel tank, fuel pump, and fuel rail. Fuel injector 66 is supplied operating current from driver 68 which responds to controller 12. In some examples, the engine 10 may be a gasoline engine, and the fuel tank may include gasoline, which may be injected by injector 66 into the combustion chamber 30. However, in other examples, the engine 10 may be a diesel engine, and the fuel tank may include diesel fuel, which may be injected by injector 66 into the combustion chamber. Further, in such examples where the engine 10 is configured as a diesel engine, the engine 10 may include a glow plug to initiate combustion in the combustion chamber 30.

Intake manifold 144 is shown communicating with throttle 62 which adjusts a position of throttle plate 64 to control airflow to engine cylinder 30. This may include controlling airflow of boosted air from intake boost chamber 146. In some embodiments, throttle 62 may be omitted and airflow to the engine may be controlled via a single air intake system throttle (AIS throttle) 82 coupled to air intake passage 42 and located upstream of the intake boost chamber 146. In yet further examples, AIS throttle 82 may be omitted and airflow to the engine may be controlled with the throttle 62.

In some embodiments, engine 10 is configured to provide exhaust gas recirculation, or EGR. When included, EGR may be provided as high-pressure EGR and/or low-pressure EGR. In examples where the engine 10 includes low-pressure EGR, the low-pressure EGR may be provided via EGR passage 135 and EGR valve 138 to the engine air intake system at a position downstream of air intake system (AIS) throttle 82 and upstream of compressor 162 from a location in the exhaust system downstream of turbine 164. EGR may be drawn from the exhaust system to the intake air system when there is a pressure differential to drive the flow. A pressure differential can be created by partially closing AIS throttle 82. Throttle plate 84 controls pressure at the inlet to compressor 162. The AIS may be electrically controlled and its position may be adjusted based on optional position sensor 88.

Ambient air is drawn into combustion chamber 30 via intake passage 42, which includes air filter 156. Thus, air first enters the intake passage 42 through air filter 156. Compressor 162 then draws air from air intake passage 42 to supply boost chamber 146 with compressed air via a compressor outlet tube (not shown in FIG. 1). In some examples, air intake passage 42 may include an air box (not shown) with a filter. In one example, compressor 162 may be a turbocharger, where power to the compressor 162 is drawn from the flow of exhaust gases through turbine 164. Specifically, exhaust gases may spin turbine 164 which is coupled to compressor 162 via shaft 161. A wastegate 72 allows exhaust gases to bypass turbine 164 so that boost pressure can be controlled under varying operating conditions. Wastegate 72 may be closed (or an opening of the wastegate may be decreased) in response to increased boost demand, such as during an operator pedal tip-in. By closing the wastegate, exhaust pressures upstream of the turbine can be increased, raising turbine speed and peak power output. This allows boost pressure to be raised. Additionally, the wastegate can be moved toward the closed position to maintain desired boost pressure when the compressor recirculation valve is partially open. In another example, wastegate 72 may be opened (or an opening of the wastegate may be increased) in response to decreased boost demand, such as during an operator pedal tip-out. By opening the wastegate, exhaust pressures can be reduced, reducing turbine speed and turbine power. This allows boost pressure to be lowered.

However, in alternate embodiments, the compressor 162 may be a supercharger, where power to the compressor 162 is drawn from the crankshaft 40. Thus, the compressor 162 may be coupled to the crankshaft 40 via a mechanical linkage such as a belt. As such, a portion of the rotational energy output by the crankshaft 40, may be transferred to the compressor 162 for powering the compressor 162.

Compressor recirculation valve 158 (CRV) may be provided in a compressor recirculation path 159 around compressor 162 so that air may move from the compressor outlet to the compressor inlet so as to reduce a pressure that may develop across compressor 162. A charge air cooler 157 may be positioned in boost chamber 146, downstream of compressor 162, for cooling the boosted aircharge delivered to the engine intake. However, in other examples as shown in FIG. 1, the charge air cooler 157 may be positioned downstream of the electronic throttle 62 in an intake manifold 144. In some examples, the charge air cooler 157 may be an air to air charge air cooler. However, in other examples, the charge air cooler 157 may be a liquid to air cooler.

In the depicted example, compressor recirculation path 159 is configured to recirculate cooled compressed air from upstream of charge air cooler 157 to the compressor inlet. In alternate examples, compressor recirculation path 159 may be configured to recirculate compressed air from downstream of the compressor and downstream of charge air cooler 157 to the compressor inlet. CRV 158 may be opened and closed via an electric signal from controller 12. CRV 158 may be configured as a three-state valve having a default semi-open position from which it can be moved to a fully-open position or a fully-closed position.

Universal Exhaust Gas Oxygen (UEGO) sensor 126 is shown coupled to exhaust manifold 148 upstream of emission control device 70. Alternatively, a two-state exhaust gas oxygen sensor may be substituted for UEGO sensor 126. Emission control device 70 may include multiple catalyst bricks, in one example. In another example, multiple emission control devices, each with multiple bricks, can be used. While the depicted example shows UEGO sensor 126 upstream of turbine 164, it will be appreciated that in alternate embodiments, UEGO sensor may be positioned in the exhaust manifold downstream of turbine 164 and upstream of emission control device 70. Additionally or alternatively, the emission control device 70 may comprise a diesel oxidation catalyst (DOC) and/or a diesel cold-start catalyst, a particulate filter, a three-way catalyst, a $NO_x$ trap, selective catalytic reduction device, and combinations thereof. In some examples, a sensor may be arranged upstream or downstream of the emission control device 70, wherein the sensor may be configured to diagnose a condition of the emission control device 70.

Controller 12 is shown in FIG. 1 as a microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an input device 130 for sensing input device pedal position (PP) adjusted by a vehicle operator 132; a knock sensor for determining ignition of end gases (not shown); a measurement of engine manifold pressure (MAP) from pressure sensor 121 coupled to intake manifold 144; a measurement of boost pressure from pressure sensor 122 coupled to boost chamber 146; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, Hall effect sensor 118 produces a predetermined number of equally spaced pulses every revolution of the crankshaft from which engine speed (RPM) can be determined. The input device 130 may comprise an accelerator pedal and/or a brake pedal. As such, output from the position sensor 134 may be used to determine the position of the accelerator pedal and/or brake pedal of the input device 130, and therefore determine a desired engine torque. Thus, a desired engine torque as requested by the vehicle operator 132 may be estimated based on the pedal position of the input device 130.

In some examples, vehicle 5 may be a hybrid vehicle with multiple sources of torque available to one or more vehicle wheels 59. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 40 of engine 10 and electric machine 52 are connected via a transmission 54 to vehicle wheels 59 when one or more clutches 56 are engaged. In the depicted example, a first clutch 56 is provided between crankshaft 40 and electric machine 52, and a second clutch 56 is provided between electric machine 52 and transmission 54. Controller 12 may send a signal to an actuator of each clutch 56 to engage or disengage the clutch, so as to connect or disconnect crankshaft 40 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 61 to provide torque to vehicle wheels 59. Electric machine 52 may also be operated as a generator to provide electrical power to charge battery 61, for example during a braking operation.

The controller 12 receives signals from the various sensors of FIG. 1 and employs the various actuators of FIG. 1 to adjust engine operation based on the received signals and instructions stored on a memory of the controller. For example, coolant flow to the primary combustion chamber 30 and to a pre-chamber described below with respect to FIG. 2 may be adjusted based on feedback from at least a temperature sensor of the pre-chamber and/or its coolant circuit.

Turning now to FIG. 2, it shows an example of a single cylinder of an engine 200. In one example, the engine 200 may be a non-limiting example of the engine 10 of FIG. 1. As such, the engine 200 may be included within the embodiment of a hybrid vehicle, such as vehicle 6 of FIG. 1.

The engine 200 comprises a primary combustion chamber 201. In one example, the primary combustion chamber 201 is substantially similar to the combustion chamber 30 of FIG. 1. The primary combustion chamber 201 may be defined via a cylinder head 202, a first interior cylinder wall 228, a second interior cylinder wall 230, and a piston surface 231. It will be appreciated that the first interior cylinder wall 228 and the second interior cylinder wall 230 may be a single, continuous wall. However, in the example of FIG. 2, the cross-section divides the walls into two pieces.

The piston surface 231 corresponds to an upper surface of the piston 234, wherein the piston 234 may be configured to oscillate within the primary combustion chamber 201 via a crankshaft 232. The crankshaft may rotate as a fuel air mixture within the primary combustion chamber 201 combusts and presses against the piston surface 231 and pushes the piston 234 downward. This action may result in motion of the vehicle.

To enhance combustion properties, such as combustion distribution, a pre-chamber 244 is fluidly coupled to the primary combustion chamber 201 via a plurality of passages including a first outlet passage 246, a second outlet passage 248, and a third outlet passage 280. The pre-chamber 244 comprises a fuel injector 260 and an ignition device 258. In one example, the ignition device 258 is a spark plug and the fuel injector 260 is configured to inject gasoline. Additionally or alternatively, the ignition device 258 may be a glow plug and the fuel injector 260 may be configured to inject diesel. In some examples, additionally or alternatively, the fuel injector 260 may be configured to inject a mixture of fuels including alcohols.

In one example, the primary combustion chamber 201 is free of an ignition device, but comprises its own fuel injector separate from the fuel injector 260. In one example, the primary combustion chamber 201 may comprise a port injector and a direct injector. The hot fuel/air mixture from the pre-chamber 244 may enter the primary combustion chamber 201 and ignite an unignited air/fuel mixture therein. By using the pre-chamber 244, ignition within the primary combustion chamber 201 may be more uniform and evenly distributed.

The primary combustion chamber 201 may receive air flow from an air intake passage 236 when an intake valve 238 is in an open position. The pre-chamber 244 may receive air from the primary combustion chamber 201 via the first, second, and third outlet passages 246, 248, and 250. The primary combustion chamber 201 may be fluidly coupled to an exhaust passage 240 when an exhaust valve 242 is in an open position. Exhaust gases along with other combustion artifacts (e.g., air, unburned fuel, etc.) may be expelled to the exhaust passage 240 from the primary combustion chamber 201. When the intake valve 238 and the exhaust valve 242 are in closed positions, such as the positions illustrated, the primary combustion chamber 201, and the pre-chamber 244 may be fluidly sealed from the intake passage 236 and the exhaust passage 240.

In this way, the primary combustion chamber 201 is a separate volume of space relative to the pre-chamber 244, wherein a volume of the primary combustion chamber 201 is greater than a volume of the pre-chamber 244. The pre-chamber 244 may receive intake gases from the primary combustion chamber 201 and release an at least partially ignited fuel/air mixture to the primary combustion chamber 201 to initiate combustion within the primary combustion chamber 201.

Each of the primary combustion chamber 201 and the pre-chamber 244 may comprise separate fluid jackets for receiving coolant. The coolant jacket(s) for the primary combustion chamber 201 are arranged in a cylinder block 204 and the cylinder head 202 and the coolant jacket(s) for the pre-chamber 244 are arranged only in the cylinder head 202. Line 206 marks a divide between the cylinder head 202 and the cylinder block 204, wherein the head is located on a first side 208 of the line 206 and the block is located on a second side 210 of the line 206, wherein the second side 210 is opposite the first side 208. An entirety of the pre-chamber 244 is located on the first side 208 of the line 206 in the cylinder head 202. A majority of the primary combustion chamber 201 is arranged on the second side 210 within the cylinder block 204. In one example, a location of the pre-chamber 244 is along a fire deck.

More specifically, the primary combustion chamber 201 comprises a primary coolant jacket having a first primary chamber 212, a second primary chamber 214, a third primary chamber 216, a fourth primary chamber 218, a fifth primary chamber 220, a sixth primary chamber 222, a seventh primary chamber 224, and an eighth primary chamber 226. Only the fourth and fifth primary chambers 218, 220 may be arranged on the first side 208 of the line 206 while the first, second, third, sixth, seventh, and eighth primary chambers 212, 214, 216, 222, 224, 226 are arranged on the second side 210 of the line 206. While the primary coolant chambers of the primary coolant jacket of the primary combustion chamber 201 are illustrated as distinct portions, it will be appreciated that the primary coolant jacket may be a single, continuous piece surrounding the primary combustion chamber 201.

The pre-chamber 244 comprises a secondary coolant jacket having a first secondary chamber 252, a second secondary chamber 254, and a third secondary chamber 256. Each of the first, second, and third secondary chambers 252, 254, 256 are arranged on the first side 208 of the line 206 within the cylinder head 202. The first, second, and third secondary chambers are fluidly coupled to one another. Furthermore, the first, second, and third secondary chambers of the secondary coolant jacket are fluidly separated from coolant in each of the first, second, third, fourth, fifth, sixth, seventh, and eighth primary chambers of the primary coolant jacket. As such, each of the primary coolant jacket and the secondary coolant jacket may be fluidly coupled to separate coolant circuits. Coolant flow to the primary and secondary coolant jackets is described in greater detail below.

Turning now to FIG. 3, it shows an example of a first coolant circuit 301 and a second coolant circuit 303. As will be described herein, the primary coolant jacket 310 may receive coolant from only the first coolant circuit 301. The secondary coolant jacket 350 may receive coolant from each of the second coolant circuit 303 and the first coolant circuit 301.

The first coolant circuit 301 comprises a first radiator 300 configured to cool a first coolant flowing through the first coolant circuit 301 when a first coolant temperature is greater than a threshold temperature. The first coolant circuit 301 comprises a temperature sensor 312 arranged upstream of a first valve 304 relative to a direction of first coolant flow. More specifically, the first coolant may exit the eighth chamber 226 and flow toward the temperature sensor 312. The temperature sensor 312 may sense a temperature of the first coolant and provide feedback to the controller 12. The controller may then adjust a position of the first valve 304 based on the first coolant temperature. For example, if the first coolant temperature is greater than the threshold temperature, then cooling of the first coolant may be desired and the first coolant is directed to the first radiator 300 before flowing to a first coolant circuit pump 302. If the first coolant temperature is less than or equal to the threshold temperature, then cooling of the first coolant may not be desired and the first valve may be actuated to a position to bypass the first radiator 300 and directly flow the first coolant to the first coolant circuit pump 302.

The first coolant circuit pump 302 may direct the first coolant to one or more of a blending valve 316 or the first primary chamber 212. If the first coolant flows to the first primary chamber 212, it may then flow to the second primary chamber 214, the third primary chamber 216, the fourth primary chamber 218, the fifth primary chamber 220, the sixth primary chamber 222, the seventh primary chamber 224, and the eighth primary chamber 226. The first coolant may then exit the eighth primary chamber 226 and return to the first coolant circuit 301.

The second coolant circuit 303 comprises a second radiator 306 configured to cool a coolant flowing through the second coolant circuit 303 when a second coolant temperature is greater than a threshold second coolant temperature. The second coolant circuit 303 comprises a temperature sensor 314, which may be similar to the temperature sensor 312 of the first coolant circuit 301, wherein the temperature sensor 314 is arranged upstream of a second valve 310 relative to a direction of second coolant flow. The second coolant may exit the third chamber 256 arranged in the cylinder head 202 adjacent to the ignition device 258 and flow toward the temperature sensor 314. The temperature sensor 314 may sense a temperature of the second coolant and provide feedback to the controller 12, wherein the controller may adjust a position of the second valve 310 based on the second coolant temperature. For example, if the second coolant temperature is greater than the threshold second coolant temperature, then cooling of the second coolant may be desired and the second valve 310 is adjusted to a position to allow the second coolant to flow to the second radiator 306. The second radiator 306 may then direct the second coolant to flow to the second coolant circuit pump 308. If the second coolant temperature is less than or equal to the threshold second coolant temperature, then cooling of the second coolant may not be desired and the second valve 310 may be adjusted to a position that blocks coolant flow to the second radiator 306 and directly flows the second coolant to the second coolant circuit pump 308.

The second coolant circuit pump 308 may be configured to direct the second coolant to one or more of the first secondary chamber 252 and the blending valve 316. In one example, additionally or alternatively, the second coolant circuit pump 308 may be configured to flow the second coolant to only the first secondary chamber 252. However, in one example, the blending valve 316 may be thermostatically controlled and configured to allow a mixture of first and second coolant flows to the first secondary chamber 252 in response to a desired mixed coolant temperature being met. In response to the desired mixed coolant temperature being met, the blending valve 316 may move to a position where coolant may flow to the first secondary chamber 252. In this way, while a complexity of the blending valve 316 may be relatively increased to previous examples of multi-way valves, the complexity and cost of the first coolant circuit pump 302 and the second coolant circuit pump 308 may be reduced, which may result in an overall reduction in manufacturing costs and coolant system complexity. In this way, the blending valve 316 may comprise a chamber or other container arranged therein where the first coolant and the second coolant may mix before flowing through an open position of the blending valve 316 toward the first secondary chamber 252.

In one example, the blending valve 316 comprises a plurality of positions including a first position, a second position, a third position, and a fourth position. The first position may correspond to a fully closed position, wherein each of the first coolant and the second coolant are completely blocked from flowing to the secondary coolant chamber. The second position may correspond to a first partially open position which allows only the second coolant to flow to the secondary coolant chamber. The third position may correspond to a second partially open position which allow only the first coolant to flow to the secondary coolant chamber. The fourth position may correspond to a blending position wherein each of the first coolant and the second coolant flow to the secondary coolant chamber. It will be appreciated that the first coolant and the second coolant may be similar types of coolant maintained at different temperatures within their respective circuits.

It will be appreciated that the temperature sensor 312 may be combined with the first valve 304 in some embodiments. In one example, the first valve 304 may comprise a thermostatic control integrally formed therein, such as a wax thermostatic control. The temperature sensor 314 may be similarly combined with the second valve 310 in some embodiments.

In some examples, a premixing chamber may be arranged upstream of the blending valve 316, wherein the first coolant may mix with the second coolant in the premixing chamber and then flow to the blending valve 316. In this way, a complexity of the blending valve 316 may be reduced relative to other examples of the blending valve.

In one example, additionally or alternatively, the second coolant circuit pump 308 may be forced to flow all of the second coolant through the blending valve 316 before flowing the second coolant to the first secondary chamber 252. As such, in one example, the second coolant circuit pump 308 may not be able to directly flow coolant to the first secondary chamber 252.

By blending coolant flows from the first coolant circuit 301 and the second coolant circuit 303, a desired temperature of the pre-chamber 244 may be more easily achieved compared to alternating flows of the first coolant and the second coolant to the first secondary chamber 252 or by flowing only the second coolant to the first secondary chamber 252. Additionally, the configuration of the first and second coolant circuits 301, 303 allows flow of only the first coolant or only the second coolant to the first secondary chamber 252. Additionally, the second coolant does not flow to any of the first, second, third, fourth, fifth, sixth, seventh, and eighth primary chambers of the primary combustion chamber 201.

In one example, the second coolant of the second coolant circuit 303 may comprise temperature less than or equal to a temperature of the first coolant of the first coolant circuit 301. As such, in some examples, the second radiator 306 may be a lower-temperature radiator and the first radiator 300 may be a higher temperature radiator. Alternatively, the first radiator 300 and the second radiator 306 may be similar temperatures. It may be desired to not flow the second coolant to the primary coolant chamber due to packaging constraints as the cooling demands of the primary combustion chamber are greater than that of the pre-chamber 244. As such, a packaging size of the second coolant circuit may be reduced relative to the first coolant circuit. In one example, the second coolant circuit is dedicated to flowing coolant to only the secondary coolant chamber. However, it will be appreciated that the second coolant circuit may also be utilized for temperature regulation of other components with lower cooling demands than the primary combustion chamber.

Thus, in the example of FIG. 3, an engine comprises the primary combustion chamber 201 and a pre-chamber 244. The pre-chamber 244 comprises a fuel injector 260 separate from fuel injectors of the primary combustion chamber 201. As the intake valve 238 moves downward to an open position, intake air may flow into the primary combustion chamber 201 and into the pre-chamber 244. The pre-chamber 244 may mix the intake air with fuel and ignite the air/fuel mixture therein. The hot air/fuel mixture may leave the pre-chamber and enter the primary combustion chamber 201, wherein the hot air/fuel mixture may ignite an air/fuel mixture of the primary combustion chamber 201. In this way, the primary combustion chamber 201 may be free of an ignition device.

Temperature regulation of the primary combustion chamber 201 may be executed via the first coolant circuit 301 and the first radiator 300. In one example, the primary combustion chamber temperature is regulated via only the first coolant circuit 301. The pre-chamber temperature may be regulated via a combination of the first coolant circuit 301 and the second coolant circuit 303. During some conditions, the pre-chamber 244 may receive only one of the first coolant of the first coolant circuit 301 or the second coolant of the second coolant circuit 303. However, there may be conditions where receiving a blend of first coolant and the second coolant may provide an optimal operating temperature for the pre-chamber 244. Furthermore, each circuit comprises a radiator bypass, which may further enhance temperature control of the pre-chamber 244. In this way, coking may be avoided while a combustion stability of the pre-chamber 244 may be enhanced to improve a combustion efficiency of the primary combustion chamber 201, which may result in increased power output and decreased emissions. In one example, a condition where blending the first coolant and the second coolant may include where a combustion rate is decreasing due to coking or other condition. As such, a specific temperature for promoting removal of the coking without overly increasing the combustion temperatures may be desired. In such an example, a blend of the first coolant and the second coolant may be realized to promote coking removal due to an increased temperature while not increasing a temperature to greater than a threshold temperature.

Although not depicted in the example of FIG. 3, the first coolant and the second coolant may be maintained completely separated apart from mixing at the blending valve 316 and mixing at a shared degas bottle. In this way, a single degas bottle may be used to depressurize the first and second coolants. Additionally or alternatively, in some examples, each of the first coolant and the second coolant may comprise separate degas bottles such that the first coolant and the second coolant only mix at the blending valve 316.

Additionally or alternatively, the blending may enhance temperature control of the first and second coolants. For example, the first coolant may be used to increase a temperature of the second coolant more rapidly. Additionally or alternatively, the second coolant may be used to further decrease a temperature of the first coolant relative to a cooling provided via the first radiator. In some examples, cooling via the second coolant may be selected over cooling via the first radiator since the second coolant may provide less cooling relative to the first radiator. In this way, a temperature of the first coolant may be optimized, which may result in greater temperature control of the primary combustion chamber 201 in addition to the pre-chamber 244.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Turning now to FIG. 4, it shows a method for adjusting coolant flow to the primary coolant jacket and the secondary coolant jacket (e.g., primary coolant jacket 310 and secondary coolant jacket 350 of FIG. 3). Instructions for carrying out method 400 may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

The method 400 begins at 402, which includes determining, estimating, and/or measuring one or more current engine operating parameters. The one or more current engine operating parameters may include but are not limited to throttle position, manifold pressure, engine speed, vehicle speed, engine temperature, EGR flow rate, and an air/fuel ratio. In one example, the engine temperature may be determined based on a temperature of a first coolant in the primary coolant jacket based on feedback from the temperature sensor 112 of FIG. 1. Additionally or alternatively, the engine temperature may be determined based on feedback from the temperature sensor 314 of the second circuit 303 of FIG. 3.

The method 400 may proceed to 404, which includes determining if a cold-start is occurring. A cold-start may be occurring if an engine temperature is less than a threshold cold-start temperature. In one example, the threshold cold-start temperature is based on a lowest desired engine operating temperature.

If a cold-start is occurring then the method 400 proceeds to 406, which includes not mixing the first and second coolants. The method 400 may then proceed to 408, which includes flowing the first coolant to only the primary coolant jacket. Additionally or alternatively, the second coolant may be directed to the secondary coolant jacket. As such, latent heat from the primary combustion chamber may heat the first coolant. Similarly, latent heat from the pre-chamber may heat the second coolant. By maintaining the first and second coolants separated, the first coolant may warm-up more quickly due to the higher latent heat of the primary combustion chamber relative to the pre-chamber.

In some examples of the method 400, the first coolant may be directed toward the secondary coolant chamber following a duration of time. For example, once the first coolant temperature approaches or is equal to the lowest desired engine operating temperature, the first coolant temperature may be used to heat the pre-chamber by flowing only the first coolant to the secondary coolant chamber. In such an example, the blending valve (e.g., blending valve 316 of FIG. 3) may block second coolant flow to the secondary coolant chamber while allowing only the first coolant to flow to the secondary coolant chamber.

In some examples, if combustion stability or various other conditions of the pre-chamber are below desired thresholds, then the first coolant may be directed to the pre-chamber during the cold-start to maintain desired combustion conditions.

If a cold-start is not occurring, then the method 400 proceeds to 410 which includes determining if the primary coolant jacket temperature is greater than an upper threshold temperature. In one example, the upper threshold temperature is based on a highest desired engine operating temperature. If the primary coolant jacket temperature is greater than the upper threshold temperature, then the method 400 proceeds to 406 as described above to allow the first coolant to flow to only the primary coolant chamber. The first coolant may be directed through the first radiator and back to the first primary chamber to provide increased cooling compared to bypassing the first radiator.

If the primary cooling jacket temperature is less than or equal to the upper threshold temperature, then the method proceeds to 412, which includes monitoring one or more conditions of the pre-chamber including a tip erosion temperature limit at 414, a coking temperature limit at 416, a combustion stability temperature limit at 418, and a likelihood of knock at 420. For example, the coking temperature limit and the tip erosion temperature limit may be based on higher temperature thresholds than the combustion stability temperature limit. As such, coolant demands of the pre-chamber may be adjusted as its temperature increases toward the tip erosion temperature limit or the coking temperature limit or decreases toward the combustion stability temperature limit or a knock temperature limit where knock is more likely to occur than other temperatures.

The method 400 proceeds to 422, which includes determining if one or more of the pre-chamber conditions monitored at 412 is outside of a desired range and/or a corresponding limit. If all of the pre-chamber conditions are within desired ranges and/or limits, then the method 400 proceeds to 424, which includes maintaining current operating parameters and continues to monitor pre-chamber conditions.

If one or more of the pre-chamber conditions is outside of a desired range and/or limit, then the method 400 proceeds to 426, which includes adjusting coolant flow to the secondary coolant chamber of the pre-chamber. In one example, coolant flow to the primary coolant chamber of the primary combustion chamber is not adjusted.

The method 400 proceeds to 428, which includes determining if warmer pre-chamber temperatures are desired. Warmer pre-chamber temperatures may be desired if the pre-chamber temperature is too low, a combustion stability is low or if a likelihood of knock is relatively high. If warmer pre-chamber temperatures are not desired, then the method 400 proceeds to 430, which includes flowing the second coolant to the second radiator to provide lower pre-chamber temperatures. In one example, when the pre-chamber demands lower temperatures, the coolant flow to the pre-chamber may include only the second coolant since the second coolant circuit may be a lower temperature coolant circuit than the first coolant circuit. Additionally or alternatively, the coolants may not be mixed or blended to determine if the second coolant circuit may independently meet the cooling demands of the pre-chamber without mixing the first and second coolants.

The method 400 proceeds to 432 to determine if warmer pre-chamber temperatures are desired. That is to say, the method 400 determines if the cooling provided by only the second coolant was too much and if the pre-chamber temperature would optimize pre-chamber combustion with higher temperature. If warmer pre-chamber temperatures are desired, then the method 400 proceeds to 434, which includes blending and/or mixing the first and second coolants. As such, the blending valve may move to position where the first coolant and the second coolant flow to the secondary coolant chamber of the pre-chamber in order to adjust the pre-chamber temperature to a desired temperature. In one example, to further enhance the temperature control of the pre-chamber, one or more of the first coolant and the second coolant may bypass their respective radiators. Additionally or alternatively, a portion of the first coolant may bypass the first radiator and/or a portion of the second coolant may bypass the second radiator such that cooled and uncooled portions of the first coolant and the second coolant are mixing and flowing to the pre-chamber.

Returning to 432, if warmer pre-chamber temperatures are not desired, then the method 400 proceeds to 424 and maintains current operation and continues to monitor pre-chamber conditions.

Returning to 428, if warmer temperatures pre-chamber are desired, then the method 400 proceeds to 436, which includes bypassing the second radiator while flowing the second coolant to the secondary radiator. As such, only the second coolant may be used initially to meet the coolant demands of the pre-chamber.

The method 400 proceeds to 438, which includes determining if heating is still desired. If heating is not desired, then the method 400 proceeds to 424 and maintains the current operating parameters. If heating is still desired, then the method 400 proceeds to 440 to blend the first coolant with the second coolant. As such, the hotter first coolant may be mixed the cooler second coolant to increase a temperature of the pre-chamber. If further heating is desired, then the first coolant may bypass the first radiator before mixing with the second coolant.

In one real-world example, the pre-chamber may desire warmer temperatures during or following the cold-start as its temperatures may still be low. Additionally or alternatively, the pre-chamber may desire warmer temperatures following a fuel-cut off event, an engine stop, or other similar event. The pre-chamber may desire cooler temperatures during higher engine loads, warm ambient temperatures, high EGR flow rates, or other similar conditions where pre-chamber temperatures may increase.

In one example, under cold-start conditions, combustion chamber surfaces and an injector orifice may be cold, which may quench combustion gases. Incomplete combustion may produce deposits which may accumulate onto surfaces of the injector, valves, and combustion chamber. In such an example, a hottest possible coolant (e.g., only the first coolant) may be delivered to the pre-chamber.

In one example, under hot conditions, the combustion chamber surfaces and injector may be hot and cause pre-ignition directly or indirectly through heat transfer. This may lead to knock. During such a condition, it may be desired to flow a coolest possible coolant (e.g., only the second coolant) to the pre-chamber.

In one example, if coking of injector orifices are detected via a combustion rate decreasing, which may be detected based on crank rotation acceleration. In one example, if the acceleration is less than a threshold acceleration, then the combustion rate may be decreasing. Ignition in the main chamber may be impeded due to a reduced effective orifice diameters and reduced pre-chamber volume. Removal of the coking may be promoted via elevation of a temperature via reduced coolant flow and operation of the pre-chamber slightly lean.

Turning now to FIG. 5, it shows a plot 500 graphically illustrating first and second coolant flows to the pre-chamber based on a desired pre-chamber temperature. A primary coolant chamber temperature is illustrated via plot 510 along with an upper threshold primary coolant chamber temperature illustrated via dashed line 512 and a lower threshold primary coolant chamber temperature illustrated via dashed line 514, wherein the upper threshold primary coolant chamber temperature is greater than the lower threshold primary coolant chamber temperature. A pre-chamber temperature is illustrated via plot 520 along with an upper threshold secondary coolant chamber temperature via dashed line 522 and a lower threshold secondary coolant chamber temperature via dashed line 524. A second coolant flow rate is illustrated via plot 530 and a first coolant flow is illustrated via plot 540, wherein both the first coolant flow and the second coolant flow illustrate coolant flow to only the secondary coolant chamber of the pre-chamber. Plot 550 illustrates if mixing of the first and second coolants is occurring.

Prior to t1, the primary chamber temperature (plot 510) is between the lower threshold primary coolant chamber temperature (dashed line 514) and the upper threshold primary coolant chamber temperature (dashed line 512). As such, a cold-start may not be occurring. The pre-chamber temperature (plot 520) is between the lower threshold secondary coolant chamber temperature (dashed line 524) and the upper threshold secondary coolant chamber temperature (dashed line 522). A second coolant flow (plot 530) to the secondary coolant chamber is relatively high and a first coolant flow (plot 540) to the secondary coolant chamber is relatively low and/or zero. In the example of FIG. 5, the first coolant flow is zero and mixing is not occurring (plot 550).

At t1, the primary chamber temperature and the pre-chamber temperature begin to decrease. In one example, the temperatures may begin to decrease due to a fuel cut-off event, such as an engine stop or coasting event.

Between t1 and t2, the pre-chamber temperature decreases more rapidly than the primary chamber temperature, which may be due to both a smaller size of the pre-chamber relative to the primary combustion chamber along with a temperature of the second coolant being lower than the first coolant. As such, the second coolant flow rate to the secondary coolant chamber is reduced. The pre-chamber temperature falls to a temperature less than the lower threshold secondary coolant chamber temperature at t2.

Between t2 and t3, mixing occurs and each of the first coolant and the second coolant are directed toward the secondary coolant chamber. As such, the pre-chamber temperature increases and reaches a temperature between the upper and lower threshold secondary coolant chamber temperatures. At t3, the mixing continues and the first and second coolants are directed to the secondary coolant chamber. The mixing continues following t3 and may continue until the fuel is again delivered to the engine.

In this way, a primary combustion chamber may be fluidly coupled to only a first coolant circuit and a pre-chamber may be fluidly coupled to each of the first coolant circuit and a second coolant circuit. The technical effect of mixing the first coolant and the second coolant is to enhance temperature control of the pre-chamber, which may result in improved engine performance with regard to increased power output and decreased emissions.

In another representation, the engine is included in a hybrid vehicle.

An example of system, comprising a pre-chamber configured to combust fuel and air outside of a primary combustion chamber, wherein the pre-chamber is configured to receive a blended coolant flow comprising a first coolant and a second coolant.

A first example of the system further comprises where the first coolant is directed by a first coolant circuit pump of a first coolant circuit, and wherein a primary coolant chamber of the primary combustion chamber receives only the first coolant.

A second example of the system, optionally including the first example, wherein the second coolant is directed by a second coolant circuit pump of a second coolant circuit, and wherein a secondary coolant chamber of the primary combustion chamber is configured to receive only the second coolant, only the first coolant, or the blended coolant flow comprising a mixture of the first coolant and the second coolant.

A third example of the system, optionally including one or more of the previous examples, where a blending valve is configured to adjust a mixture of the first coolant and the second coolant based on feedback from only a temperature sensor arranged in the second coolant circuit.

A fourth example of the system, optionally including one or more of the previous examples, where the first coolant circuit comprises a first radiator and the second coolant circuit comprises a second radiator.

A fifth example of the system, optionally including one or more of the previous examples, where the first coolant temperature is greater than the second coolant temperature.

A sixth example of the system, optionally including one or more of the previous examples, where a blending valve is configured to adjust a mixture of the first coolant and the second coolant in the blended coolant flow, and wherein the blending valve is a multi-way valve.

An embodiment of an engine, comprises a pre-chamber arranged outside of a primary combustion chamber, wherein the pre-chamber comprises a fuel injector positioned to inject fuel therein and an ignition device, wherein the pre-chamber further comprises a plurality of outlets fluidly coupling the pre-chamber to the primary combustion chamber and a primary coolant jacket fluidly coupled to only a first coolant circuit, wherein the primary coolant jacket is arranged around a periphery of only the primary combustion chamber, and a secondary coolant jacket fluidly coupled to each of the first coolant circuit and a second coolant circuit, wherein the secondary coolant jacket is arranged around a periphery of only the pre-chamber and between the fuel injector and the ignition device.

A first example of the engine further comprises where the first coolant circuit comprises a first radiator and the second coolant circuit comprises a second radiator, wherein the first radiator is different than the second radiator.

A second example of the engine, optionally including the first example, further includes where a temperature of the first coolant circuit is different than a temperature of the second coolant circuit.

A third example of the engine, optionally including one or more of the previous examples, further includes where the second coolant circuit comprises a second coolant circuit pump, wherein the second coolant circuit is configured to direct only the second coolant directly to the secondary coolant chamber.

A fourth example of the engine, optionally including one or more of the previous examples, further includes where the first coolant circuit comprises a first coolant circuit pump, wherein the first coolant circuit is configured to directly only the first coolant directly to the first coolant chamber, wherein the first coolant circuit pump is further configured to direct the first coolant to a blending valve.

A fifth example of the engine, optionally including one or more of the previous examples, further includes where the blending valve is configured to adjust an amount of mixing between the first coolant and the second coolant based on a feedback from a temperature sensor arranged in the second coolant circuit.

A sixth example of the engine, optionally including one or more of the previous examples, further includes where the primary coolant chamber is fluidly separated from the secondary coolant chamber.

A seventh example of the engine, optionally including one or more of the previous examples, further includes where the first coolant circuit is fluidly separated from the second fluid circuit.

An embodiment of a system, comprises a primary combustion chamber fluidly coupled to a pre-chamber, wherein a volume of the primary combustion chamber is greater than a volume of the pre-chamber, a primary coolant chamber arranged around only the primary combustion chamber and a secondary coolant chamber arranged around only the pre-chamber, a first coolant circuit comprising only a first coolant, wherein the primary coolant chamber is configured to receive only the first coolant, a second coolant circuit comprising only a second coolant, wherein the secondary coolant chamber is configured to receive only the second coolant, only the first coolant, or a mixture of the first coolant and the second coolant, and a controller with computer-readable instructions stored on non-transitory memory thereof that when executed enable the controller to adjust a position of a blending valve in response to feedback from a temperature sensor arranged in the second coolant circuit.

A first example of the system further includes where the instructions further enable the controller to adjust the position of the blending valve to increase an amount of mixing of the first coolant and the second coolant in response to the pre-chamber temperature being less than a lower threshold temperature.

A second example of the system, optionally including the first example, further includes where the instructions further enable the controller to adjust the position of the blending valve to decrease an amount of mixing of the first coolant and the second coolant in response to the pre-chamber temperature being greater than an upper threshold temperature.

A third example of the system, optionally including one or more of the previous examples, further includes where the instructions further enable the controller to adjust the position of the blending valve to block mixing of the first coolant and the second coolant in response to a temperature of the primary combustion chamber exceeding a threshold temperature.

A fourth example of the system, optionally including one or more of the previous examples, further includes where the first coolant circuit and the second coolant circuit comprise separate radiators and coolant pumps.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
a pre-chamber configured to combust fuel and air outside of a primary combustion chamber, wherein the pre-chamber is configured to receive a blended coolant flow comprising a first coolant and a second coolant, wherein the first coolant is directed by a first coolant circuit pump of a first coolant circuit, and wherein a primary coolant chamber of the primary combustion chamber receives only the first coolant.

2. The system of claim 1, wherein the second coolant is directed by a second coolant circuit pump of a second coolant circuit, and wherein a secondary coolant chamber of the primary combustion chamber is configured to receive only the second coolant, only the first coolant, or the blended coolant flow comprising a mixture of the first coolant and the second coolant.

3. The system of claim 2, wherein a blending valve is configured to adjust a mixture of the first coolant and the second coolant based on feedback from only a temperature sensor arranged in the second coolant circuit.

4. The system of claim 2, wherein the first coolant circuit comprises a first radiator and the second coolant circuit comprises a second radiator.

5. The system of claim 1, wherein the first coolant temperature is greater than the second coolant temperature.

6. The system of claim 1, wherein a blending valve is configured to adjust a mixture of the first coolant and the second coolant in the blended coolant flow, and wherein the blending valve is a multi-way valve.

7. An engine, comprising:
a pre-chamber arranged outside of a primary combustion chamber, wherein the pre-chamber comprises a fuel injector positioned to inject fuel therein and an ignition device, wherein the pre-chamber further comprises a plurality of outlets fluidly coupling the pre-chamber to the primary combustion chamber; and
a primary coolant jacket fluidly coupled to only a first coolant circuit, wherein the primary coolant jacket is arranged around a periphery of only the primary combustion chamber, and a secondary coolant jacket fluidly coupled to each of the first coolant circuit and a second coolant circuit, wherein the secondary coolant jacket is arranged around a periphery of only the pre-chamber and between the fuel injector and the ignition device.

8. The engine of claim 7, wherein the first coolant circuit comprises a first radiator and the second coolant circuit comprises a second radiator, wherein the first radiator is different than the second radiator.

9. The engine of claim 7, wherein a temperature of the first coolant circuit is different than a temperature of the second coolant circuit.

10. The engine of claim 7, wherein the second coolant circuit comprises a second coolant circuit pump, wherein the second coolant circuit is configured to direct only the second coolant directly to the secondary coolant chamber.

11. The engine of claim 10, wherein the first coolant circuit comprises a first coolant circuit pump, wherein the first coolant circuit is configured to directly only the first coolant directly to the first coolant chamber, wherein the first coolant circuit pump is further configured to direct the first coolant to a blending valve.

12. The engine of claim 11, wherein the blending valve is configured to adjust an amount of mixing between the first coolant and the second coolant based on a feedback from a temperature sensor arranged in the second coolant circuit.

13. The engine of claim 7, wherein the primary coolant chamber is fluidly separated from the secondary coolant chamber.

14. The engine of claim 7, wherein the first coolant circuit is fluidly separated from the second fluid circuit.

15. A system, comprising:
a primary combustion chamber fluidly coupled to a pre-chamber, wherein a volume of the primary combustion chamber is greater than a volume of the pre-chamber;
a primary coolant chamber arranged around only the primary combustion chamber and a secondary coolant chamber arranged around only the pre-chamber;
a first coolant circuit comprising only a first coolant, wherein the primary coolant chamber is configured to receive only the first coolant;
a second coolant circuit comprising only a second coolant, wherein the secondary coolant chamber is configured to receive each of the second coolant, the first coolant, and a mixture of the first coolant and the second coolant; and
a controller with computer-readable instructions stored on non-transitory memory thereof that when executed enable the controller to:
adjust a position of a blending valve configured to adjust a mixing between the first coolant and the second coolant in response to feedback from a temperature sensor arranged in the second coolant circuit.

16. The system of claim 15, wherein the instructions further enable the controller to adjust the position of the blending valve to increase an amount of mixing of the first coolant and the second coolant in response to the pre-chamber temperature being less than a lower threshold temperature.

17. The system of claim 15, wherein the instructions further enable the controller to adjust the position of the blending valve to decrease an amount of mixing of the first coolant and the second coolant in response to the pre-chamber temperature being greater than an upper threshold temperature.

18. The system of claim 15, wherein the instructions further enable the controller to adjust the position of the blending valve to block mixing of the first coolant and the second coolant in response to a temperature of the primary combustion chamber exceeding a threshold temperature.

19. The system of claim 15, wherein the first coolant circuit and the second coolant circuit comprise separate radiators and coolant pumps.

* * * * *